June 3, 1958     T. R. BAXTER     2,837,457
METHOD OF PRODUCING GLASS SURFACED LOW PRESSURE LAMINATES
Filed July 11, 1956

INVENTOR.
THOMAS R. BAXTER
BY
*Mason, Porter, Diller & Stewart*
ATTORNEYS

United States Patent Office 2,837,457
Patented June 3, 1958

2,837,457

METHOD OF PRODUCING GLASS SURFACED LOW PRESSURE LAMINATES

Thomas R. Baxter, Mount Vernon, Ohio, assignor to Continental Can Company, Inc., New York, N. Y., a corporation of New York Application July 11, 1956, Serial No. 597,171

3 Claims. (Cl. 154—95)

The present invention relates to a method of improving the surface properties of synthetic resin articles, particularly low pressure plastic laminates by the addition thereto of a surface coating of siliceous materials, preferably bonded glass flakes.

Heretofore structural panels have been produced by the so-called low pressure laminating technique in which a fibrous substance, such as glass fibers, is first impregnated with a suitable resin and formed into a mat. Thereafter the impregnated mat is sandwiched between two cellophane sheets and subsequently cured under pressure and heat. The panels and other parts so formed are resistant to atmospheric and chemical attacks to the same extent as the plastic binder used therein. If these panels are corrugated or formed into louvers it has been found that small fibers project beyond the surface and act as a point through which water vapor or other chemically active agents can gain access to the interior of the panel. This is referred to as a wicking action and is particularly noticeable with glass fibers. Upon exposure to light and atmospheric conditions the plastic binder disintegrates and exposes more of the fibers which increase the atmospheric corrosion.

It is an object of the present invention to produce a mat of plastic bonded fibrous material having a surface coating that completely covers the surface thereof.

It is a further object of this invention to produce a mat of plastic bonded fibrous material having a surface coating that will prevent the exposure of any of the fibrous contents of the mat.

It is a still further object of this invention to produce a fibrous plastic bonded mat having a surface coating of glass which will cover the surface thereof and prevent the exposure of the plastic binder of the mat to ultra-violet and infrared light, which accelerates disintegration of the plastic binder, These and other objects of the present invention will be apparent from the description as disclosed in the following specification and drawings, wherein.

Figure 1:
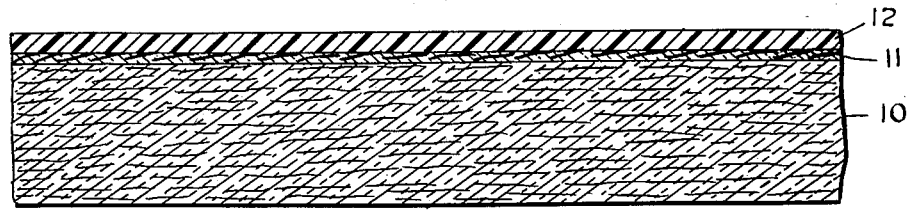
Fig. 1 is a view in section of a glass fiber panel having a coating applied thereto and a cellophane backing thereon.

Panels and other structural elements have been made by impregnating fibers, such as glass, with a resinous binder which may be formed into a panel 10, as shown in Fig. 1, by coating each side thereof with a sheet of cellophane and then curing the plastic under heat and pressure, the cellophane being stripped from the panel after the curing operation.

Figure 2:
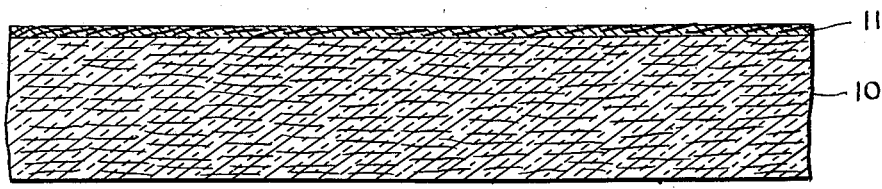
Fig. 2 is a view in section similar to Fig. 1 with the cellophane backing removed.
Figure 3:
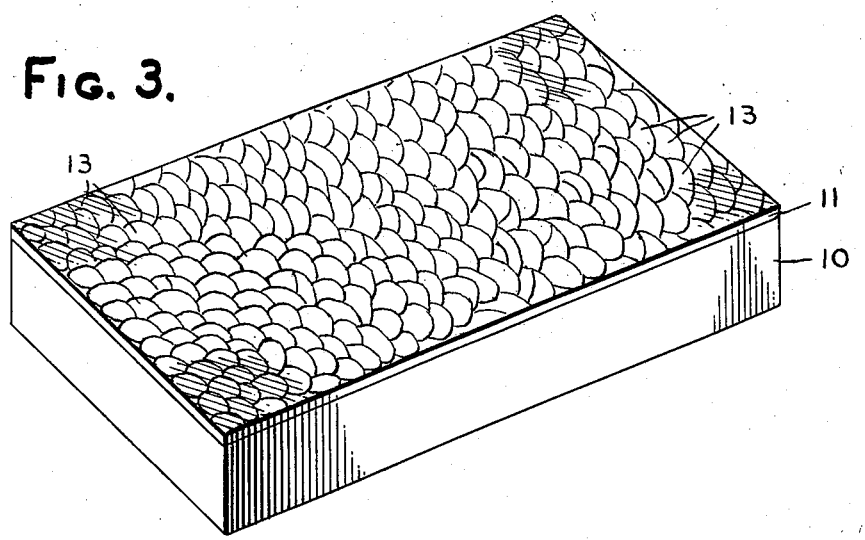
Fig. 3 is a perspective view of the panel shown in Fig. 2.

The present invention comprises the application to such a panel of a surface coating 11 by bonding to the cellophane or other web a layer of glass flakes 13, 13, impregnated with a plastic compatible with the plastic binder of the mat, and then applying this coating to the surface of the mat prior to the curing thereof. The cellophane 12 is then stripped from the mat after the curing operation, the impregnated glass coating 11 adhering to the mat 10, as shown in Figs. 2 and 3.

Glass flakes, as used in this invention, are made by casting an ultra-thin film of molten glass on a moving belt. Upon cooling the glass cracks and shatters into small flakes. This film is in the neighborhood of 5 microns thick. The flakes are then dusted with a dusting material to prevent their adhering to each other and are incorporated with an uncured plastic by milling or other processes. Such plastic acts as a binder on curing, and the following plastics have been found to give satisfactory results; polyester resin, vinyl silane, phenol silane, phenolic resins, polyisobutylene, titanium esters and Volan methacrylate chromic chloride.

The glass used in making the flakes described above may be selected so as to give the desirable properties to the final product, that is, glass resistant to transmission of ultra-violet rays may be used which will reduce the degradation of the plastic binder produced by such radiation. Similarly, a glass resistant to transmission of infrared or heat rays may be used. The flakes are usually heated to a temperature within the range of 250° F. to 700° F. to remove volatile products therefrom, such as moisture, and are then introduced into a mill containing a quantity of plastic binder such as a mixture of diallyl phthalate monomer and polymer containing a wetting agent such as about 1% of stearic acid. The glass flakes are then gradually added until the mixture contains approximately 20% to 40% flake. These are ground until they are of the desired size. The mixture is then spread on a sheet of cellophane, the oriented flakes forming a coating thereon with their flat side down, having a shingling effect and completely covering the cellophane, and adhering thereto. This is applied to one or both sides of an uncured mat of fiber bonded with a resin and the laminate thus produced is then cured under heat and pressure in the usual manner to bond the same together and to the mat by means of the diallyl phthalate. This curing operation may be shortened by the addition thereto of an accelerator. After curing, the glass flake coating adheres to the plastic bonded fiber panel and the cellophane may be stripped therefrom.

The laminate so produced has a glass flake coating in an overlapping position, covering the surface thereof and prevents the exposure of any of the fibers, which in the past caused disintegration of the plastic binder, and also provides a light protective coating. This is particularly true of those panels having a corrugated or grooved surface where heretofore it has been extremely difficult to prevent the fiber of the panel from protruding beyond the surface of the plastic binder.

Wherein in the above description of the preferred embodiment of this invention one or both sides of a mat have been described, the invention cannot be limited thereto as it is possible to coat cylindrical mats or to cover all sides of rectangular mats, and the invention is only to be limited by the claims attached hereto.

What is claimed is:

1. A method of applying a surface layer to a fiber mat which comprises; coating a carrier web with glass flakes, a thermo-setting resin and a wetting agent, applying said web to a fibrous mat so as to bring the glass flakes in contact with the mat to form a panel assembly, curing the assembly and stripping the web from the assembly.

2. A method of applying a surface layer to a glass fiber mat which comprises; coating a sheet of cellophane with glass flakes dispersed in an uncured thermo-setting resin, and a wetting agent, applying said sheet to a fibrous resin mat so as to bring the glass flakes in contact with the mat to form a panel assembly, curing the assembly with heat and pressure and stripping the cellophane from the assembly.

3. A process of coating a fibrous mat impregnated with a thermo-setting material which comprises; milling flaked glass with a wetting agent and an uncured thermo-setting resin to form a mixture, applying said mixture to a cellophane sheet, contacting the coated side of said sheet to said mat, curing the resin in the mixture on the sheet and in the body of the mat under heat and pressure and stripping the cellophane sheet from the surface thereof.

References Cited in the file of this patent

UNITED STATES PATENTS

| | | |
|---|---|---|
| 917,963 | Devillers | Apr. 17, 1906 |
| 1,431,465 | Klapp | Oct. 10, 1922 |
| 2,193,635 | Marshall | Mar. 12, 1940 |
| 2,363,324 | Hill | Nov. 21, 1944 |
| 2,483,198 | Hall | Sept. 27, 1949 |
| 2,567,186 | Cross et al. | Sept. 11, 1951 |